US008358855B2

(12) United States Patent
Hamza et al.

(10) Patent No.: US 8,358,855 B2
(45) Date of Patent: Jan. 22, 2013

(54) DETERMINING PROBABILITIES FROM COMPARED COVARIANCE APPEARANCE MODELS TO DETECT OBJECTS OF INTEREST IN IMAGES

(75) Inventors: Rida Hamza, Maple Grove, MN (US); Kwong Wing Au, Bloomington, MN (US); Santosh Mathan, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 841 days.

(21) Appl. No.: 12/499,707

(22) Filed: Jul. 8, 2009

(65) Prior Publication Data

US 2011/0007940 A1    Jan. 13, 2011

(51) Int. Cl.
*G06K 9/68* (2006.01)
(52) U.S. Cl. ........................................................ 382/218
(58) Field of Classification Search .................. 382/218
See application file for complete search history.

(56) References Cited

U.S. PATENT DOCUMENTS

| | | | |
|---|---|---|---|
| 6,876,755 | B1 | 4/2005 | Taylor et al. |
| 6,888,960 | B2 * | 5/2005 | Penev et al. .................. 382/154 |
| 7,295,709 | B2 | 11/2007 | Cootes et al. |
| 7,466,841 | B2 | 12/2008 | Bahlmann et al. |
| 7,522,773 | B2 | 4/2009 | Gallagher et al. |
| 2006/0022047 | A1 * | 2/2006 | Sewell et al. ................. 235/454 |
| 2006/0210159 | A1 * | 9/2006 | Huang et al. .................. 382/173 |
| 2007/0133878 | A1 * | 6/2007 | Porikli et al. ................. 382/190 |
| 2008/0204569 | A1 * | 8/2008 | Miller et al. ............... 348/222.1 |
| 2008/0205773 | A1 * | 8/2008 | Ma et al. ....................... 382/225 |

OTHER PUBLICATIONS

Tuzel et al., Region Covariance: A Fast Descriptor for Detection and Classification; Springer-Verlag Berlin Heidelberg, ECCV 2006, pp. 589-600.*
Ruta, Andrzej; Video-based traffic sign detection, tracking and recognition, PHD Thesis, Brunel University, West London, May 1, 2009, pp. 1-178, XP002607856.
Ruta, Andrzej, et al.; A new approach for in-vehicle camera traffic sign detection and recognition, IAPR Conference on Machine Vision Application (MVA), May 2009, pp. 1-5, XP002607860.
A. Alahi, et al.; Object detection and matching with mobile cameras collaborating with fixed cameras, ECCV, Workshop on multi-camera and multi-modal sensor fusion algorithms and applications, Oct. 18, 2008, pp. 1-12, XP002607866.

(Continued)

*Primary Examiner* — David Zarka
(74) *Attorney, Agent, or Firm* — Ingrassia Fisher & Lorenz, P.C.

(57) ABSTRACT

Methods and apparatus are provided for recognizing particular objects of interest in a captured image. One or more salient features that are correlative to an object of interest are detected within a captured image. The captured image is segmented into one or more regions of interest that include a detected salient feature. A covariance appearance model is generated for each of the one or more regions of interest, and first and second comparisons are conducted. The first comparisons comprise comparing each of the generated covariance appearance models to a plurality of stored covariance appearance models, and the second comparisons comprise comparing each of the generated covariance appearance models to each of the other generated covariance appearance model. Based on the first and second comparisons, a determination is made as to whether each of the one or more detected salient features is a particular object of interest.

19 Claims, 5 Drawing Sheets

OTHER PUBLICATIONS

Nick Barnes, et al.; Real-Time speed sign detection using the radial symmetry detector, IEEE Transactions on Intelligent Transportation Systems, IEEE Service Center, Piscataway, NJ, US, vol. 9, No. 2, Jun. 1, 2008, pp. 322-332, XP011214848.

Loy G., et al.; Fast radial symmetry for detecting points of interest, IEEE Transactions on Pattern Analysis and Machine Intelligence, IEEE Service Center, Los Alamitos, CA, US, vol. 25, No. 8, Aug. 1, 2003, pp. 959-973, XP011099376.

Oncel Tuzel, et al.; Region Covariance: A fast descriptor for detection and classification, Jan. 1, 2006, Lecture Notes in Computer Science, LNCS, Springer Berlin, DE, pp. 589-600, XP019036470.

David G. Lowe; Distinctive image features from scale-invariant keypoints, International Journal of Computer Vision, Kluwer Academic Publishers, vol. 60, No. 2, Nov. 1, 2004, pp. 91-110, XP019216426.

EP Search Report, EP10161524.3 dated Nov. 19, 2010.

Porikli, F. et al.; Covariance Tracking Using Model Update Based on Lie Algebra, Mitsubishi Electric Research Laboratories, Jun. 2006.

Loy, G. et al.; A Fast Radial Symmetry Transform for Detecting Points of Interest, Australian National University, Canberra 0200, Australia, 2002.

Forstner, W. et al; A Metric for Covariance Matrices, pp. 113-128, 1999.

Viola, P. et al.; Rapid Object Detection Using a Boosted Cascade of Simple Features, Accepted Conference on Computer Vision and Pattern Recognition 2001, pp. 1-9.

* cited by examiner

DETERMINING PROBABILITIES FROM COMPARED COVARIANCE APPEARANCE MODELS TO DETECT OBJECTS OF INTEREST IN IMAGES

STATEMENT REGARDING FEDERALLY SPONSORED RESEARCH OR DEVELOPMENT

This invention was made with Government support under NBCH080030 awarded by DOI/DARPA. The Government has certain rights in this invention.

TECHNICAL FIELD

The present invention generally relates to image processing, and more particularly relates to a system and method for detecting and recognizing particular objects of interest in a captured image.

BACKGROUND

Autonomous vehicles may be used on land, in the air, underwater, or in outer space to conduct various reconnaissance and/or surveillance operations while, in some instances, being automatically navigated. Reconnaissance, surveillance, and navigation applications often rely on the recognition of certain objects of interest, or what are sometimes referred to as "targets." Such targets may have specific structural shapes (i.e., shapes that can be modeled as a ensemble of oval or circular contours) when viewed from a captured aerial image. For example, a surface-to-air missile (SAM) site or oil storage facility will typically include multiple individual storage sites configured in a-prior known arrangements. To simplify the detection process, the individual storage sites may be defined as targets of interest. These targets of interest may be modeled as several oval or circular objects when viewed in a captured aerial image.

Relatively rapid, automated recognition of target configurations is desirable when vast data are collected and processed. A relatively fast response time and relatively high-accuracy increases the likelihood of a successful mission. One of the difficulties in implementing relatively fast and accurate automated recognition has to do with the size variety of potential targets. This size variety is related to variations in the size of actual physical structures, variations in the distance (or range) from the image capturing device to the targets, variations in the resolution and zoom capabilities of various image capturing devices, target obscuration challenges, target perspective orientation, the illumination of the operational conditions, and sensor noise, just to name a few. As a result, accurately detecting and recognizing potential targets often requires searching through a huge spatial and feature space. This can be computationally intensive, time intensive, and concomitantly can also be non-cost-effective.

Hence, there is a need for a system and method of automatically and accurately detecting and recognizing potential targets that is relatively less computationally intensive, relatively less time intensive, and relatively more cost-effective than presently known systems and methods. The present invention addresses at least this need.

BRIEF SUMMARY

In one exemplary embodiment, a method of recognizing particular objects of interest in a captured image includes detecting one or more salient features within a captured image, wherein a salient feature is a feature in the captured image that is correlative to an object of interest. The captured image is segmented into one or more regions of interest, wherein each region of interest includes a detected salient feature. A covariance appearance model is generated for each of the one or more regions of interest. First and second comparisons are conducted. Each of the first comparisons comprises comparing each of the generated covariance appearance models to a plurality of stored covariance appearance models to determine which of the one or more regions of interest at least potentially include a known object of interest. Each of the second comparison comprises comparing each of the generated covariance appearance models to each of the other generated covariance appearance model. Based at least in part on the first comparisons and the second comparisons, a determination is made as to whether each of the one or more detected salient features is a particular object of interest.

In another exemplary embodiment, a system for detecting and recognizing objects of interest in a captured image includes salient feature detection means, image segmentation means, appearance model generating means, first comparison means, second comparison means, and determination means. The salient feature detection means detects one or more salient features within a captured image, wherein a salient feature is a feature in the captured image that is correlative to an object of interest. The image segmentation means segments the captured image into one or more regions of interest, wherein each region of interest includes a detected salient feature. The appearance model generating means generates a covariance appearance model for each of the one or more regions of interest. The first comparison means conducts first comparisons, where each first comparison comprising comparing each of the generated covariance appearance models to a plurality of stored covariance appearance models to determine which of the one or more regions of interest at least potentially include a known object of interest. The second comparison means conducts second comparisons, where each second comparison comprising comparing each of the generated covariance appearance models to each of the other generated covariance appearance model. The determination means determines, based at least in part on the first comparisons and second comparisons, whether each of the detected salient feature is a particular object of interest.

Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although embodiments of the invention are described as being implemented in the context of target detection and recognition from an aerial perspective, embodiments of the invention may also be implemented in on-land, at-sea, underwater, and outer space environments. Moreover, embodiments are not limited to detecting and recognizing targets of interest that are substantially circular or oval shapes.

It is additionally noted that embodiments of the present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Figure 1:
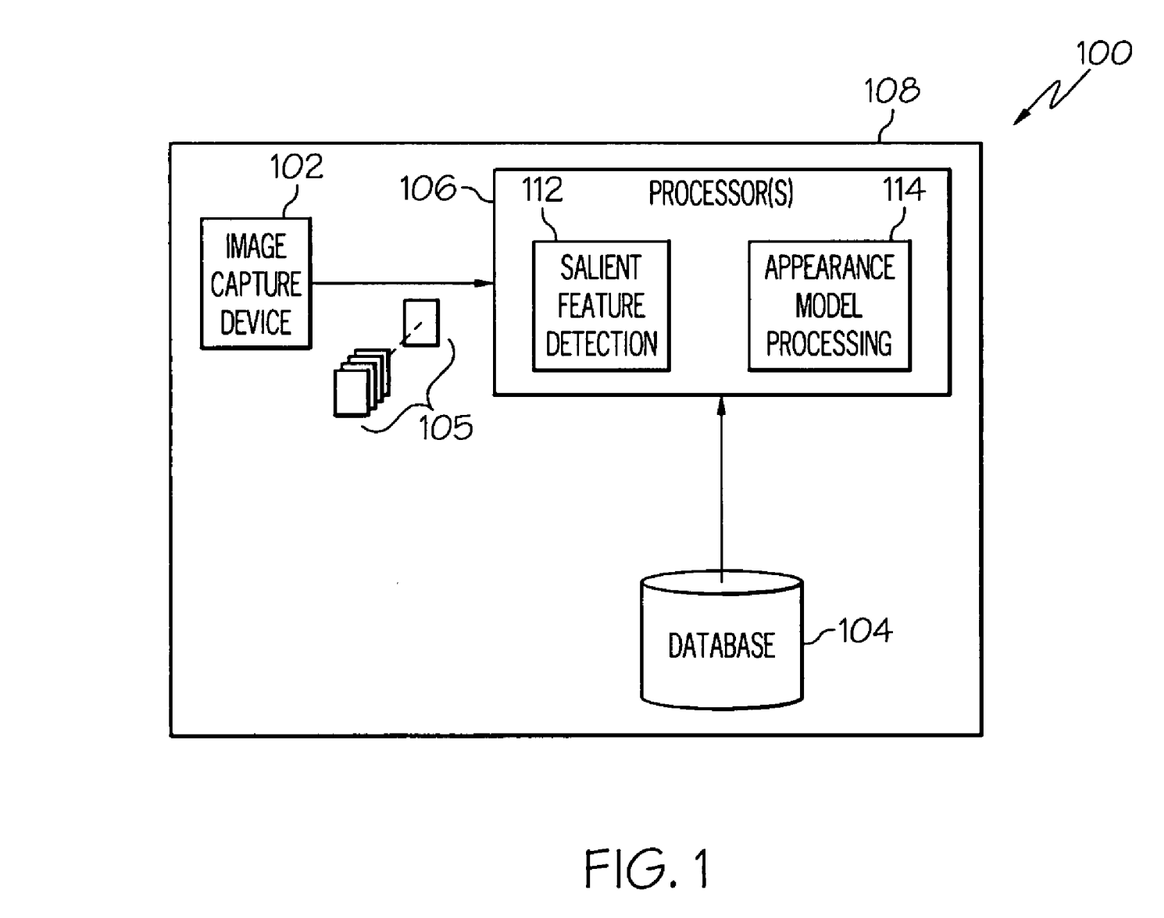
FIG. 1 depicts a functional block diagram of an exemplary embodiment of a target detection and recognition system.

Turning now to FIG. 1, a functional block diagram of an exemplary embodiment of a target detection and recognition system 100 is depicted and includes an image capture device 102, a database 104, and a processor 106. Preferably, the system 100 is installed within a vehicle 108. It will be appreciated that the vehicle 108 may be any one of numerous types of manned or unmanned vehicles, and may be an aerial, terrestrial, underwater, or space vehicle. The system 100 may also be deployed on (or in) a stationary platform, using captured data in a playback mode.

No matter the particular type of vehicle 108 in which the system is installed, the image capture device 102 is configured, as its nomenclature connotes, to capture images of various scenes. The image capture device 102 may be implemented using any one of numerous suitable devices for implementing this functionality. For example, the image capture device 102 may be implemented using an optical imaging device, an infrared imaging device, or a MMW (millimeter wavelength) radar imaging device, just to name a few. In any case, the image capture device supplies captured images 105 of the scenes to the processor 106.

The database 104 has stored therein data representative of images of various known objects of interest. More specifically, these data are preferably appearance models of various known objects of interest, and of various known objects of non-interest that are low discriminative of objects of interest. As will be described in more detail further below, the appearance models are most preferably covariance appearance models of various known objects of interest. As will also be described further below, the processor 106, as part of the processing functions it implements, conducts comparisons of generated covariance appearance models to the stored covariance appearance models to determine if a captured image at least potentially includes a known object of interest.

The processor 106 is in operable communication with the image capture device 102 and the database 104. The processor 106 is coupled to receive the captured images 105 supplied from the image capture device 102, and is configured to carry out various processing functions on the captured images to determine if the captured images include one or more objects of interest (e.g., "targets"). The various processing functions that the processor 106 carries out will be described in more detail below. Before doing so, however, it is noted that the processor 106 may be implemented using any one or more of numerous known general-purpose microprocessors and/or application specific processors that operate in response to program instructions. It will be appreciated that the processor 106 may be implemented using various other circuits, not just a programmable processor. For example, digital logic circuits and analog signal processing circuits could also be used.

The various processing functions carried out by the processor 106 implement a process that is based on template appearance modeling, and that comprises of two major components. The first component is the detection of potential objects of interest via salient feature detection 112, and the second component is applying appearance model processing 114 to the potential objects of interest. The salient feature detection component 112 is implemented by detecting one or more salient features within a captured image 105 are detected. As used herein, a salient feature is a feature in the captured image 105 that is correlative to an object of interest. The appearance model processing component 114, in its broadest sense, is implemented by comparing appearance models of detected salient features to stored appearance models, which are defined for every known object of interest, to determine if there is a match. As will be described further below, the appearance model processing component 114 additionally includes localized preprocessing to normalize the detected salient features. In particular, the features are scaled and aligned, and local contrast is adjusted based upon the shape of the detected salient feature.

Figure 2:
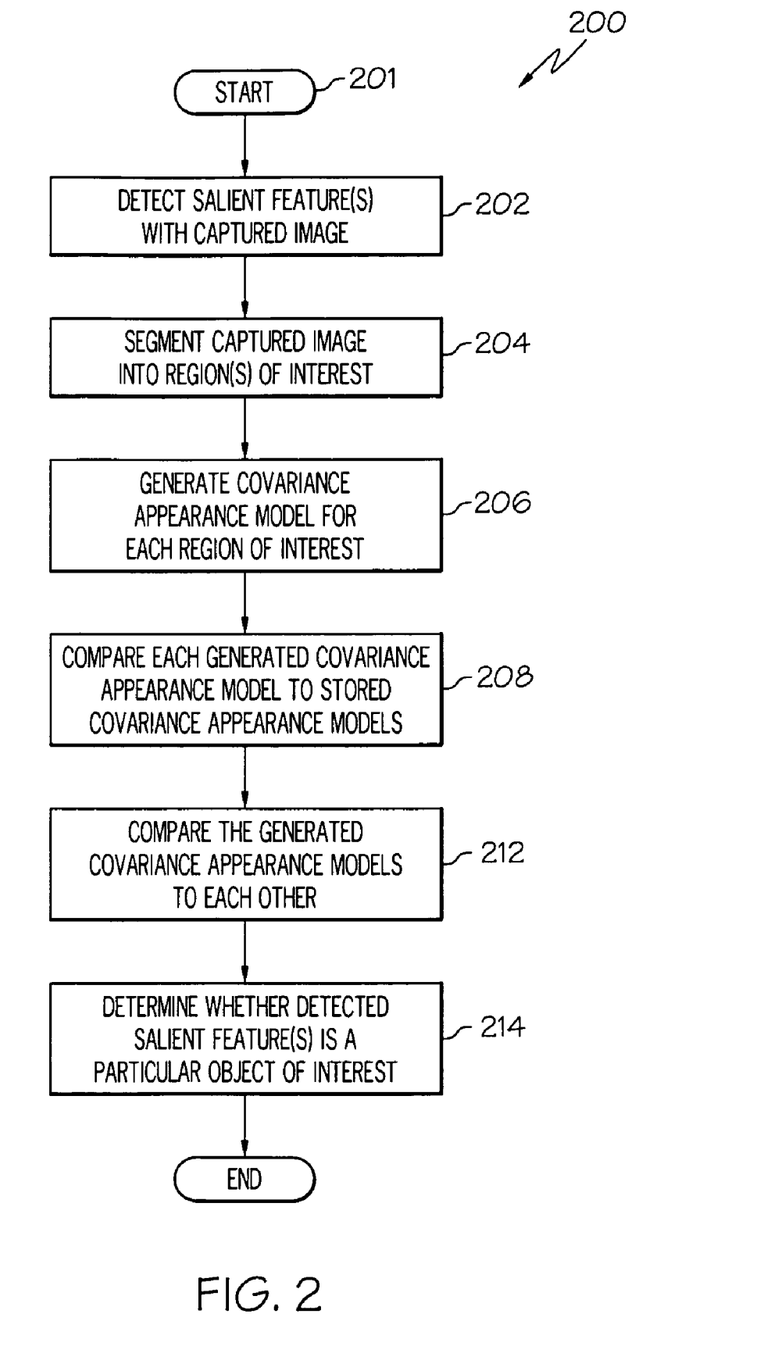
FIG. 2 depicts an exemplary process, in flowchart form, that may be implemented by the exemplary system of FIG. 1.

With reference now to FIG. 2, the process 200 that the processor 106 implements in carrying out the above-described processing functions is depicted in flowchart form, and will now be described. Before doing so, however, it is noted that the depicted process 200 is merely exemplary of any one of numerous ways of depicting and implementing the overall process 200 to be described. Moreover, the process 200 may be a software-driven process that is stored, in whole or in part, on one or more computer-readable media. It will additionally be appreciated that the software may be stored, in whole or in part, in one or more non-illustrated memory devices. With this background in mind, it is additionally noted that the numerical parenthetical references in the following description refer to like steps in the flowchart depicted in FIG. 2.

The initial step in the depicted process 200 includes detecting one or more salient features within a captured image 105 (202). As was previously noted, a salient feature is a feature in the captured image 105 that is correlative to an object of interest. It will be appreciated that the processor 106 carries out this process step (202) by implementing a salient feature detector. The particular type of salient feature detector may vary depending, for example, on the shape of the objects of interest. In particular, if objects of interest are substantially circular, then any one of numerous known radial symmetry detectors may be implemented. In a preferred embodiment, however, when objects of interest are substantially circular, a radial symmetry detector modified by the inventors of the invention described herein is used. This modified radial symmetry detector implements a modified radial symmetry detection paradigm, in which the circular measure of salient features is based on the maximum strengths of a set of radii. The skilled artisan will appreciate that this differs from a conventional radial symmetry detection paradigm, in which the circular measure of salient features is based on the average strengths of a set of radii.

After any salient features are detected in the captured image 105, the captured image 105 is segmented into one or more regions of interest (204), where each region of interest includes a detected salient feature. It is noted that the raw pixels surrounding the salient features may undergo a normalization procedure in which features are scaled and rotated and local contrast is adjusted prior to feature extraction. A covariance appearance model is then generated for each of the one or more regions of interest (206), and then first and second comparisons are conducted (208, 212). The first comparisons (208) comprise comparing each of the generated covariance appearance models to a plurality of stored covariance appearance models to determine which of the one or more regions of interest at least potentially include a known object of interest. The second comparisons (212) comprise comparing each of the generated covariance appearance models to each of the other generated covariance appearance model. Thereafter, a determination is made, based at least in part on the first comparisons and the second comparisons, as to whether each of the one or more detected salient features is a particular object of interest (214).

The appearance model processing 114, which comprises the covariance appearance model generation and the first and second comparisons (206-212) described above, can in some instances result in recovery of information that is lost during salient feature detection (202). This may limit the overall success of the process 200. To ameliorate this potential drawback, either of two alternative processing approaches may be implemented. The alternative approaches, both of which implement the overall process 200 just described, are referred to herein as a sequential approach and a parallel approach. When implementing the sequential approach, constraints associated with the salient feature detection 112 may be relaxed. Thus, all possible objects that fit the salient features test, including so-called "false positives," are propagated to the appearance model processing 114. The appearance model processing 114 processes all these possibilities and selects the best matches. When implementing the parallel approach, the salient feature detection 112 and the appearance model processing 114 are implemented simultaneously. Representations of the sequential and parallel approaches are depicted in FIGS. 3 and 4, respectively, and will now be described in turn, beginning with the sequential approach.

Figure 3:
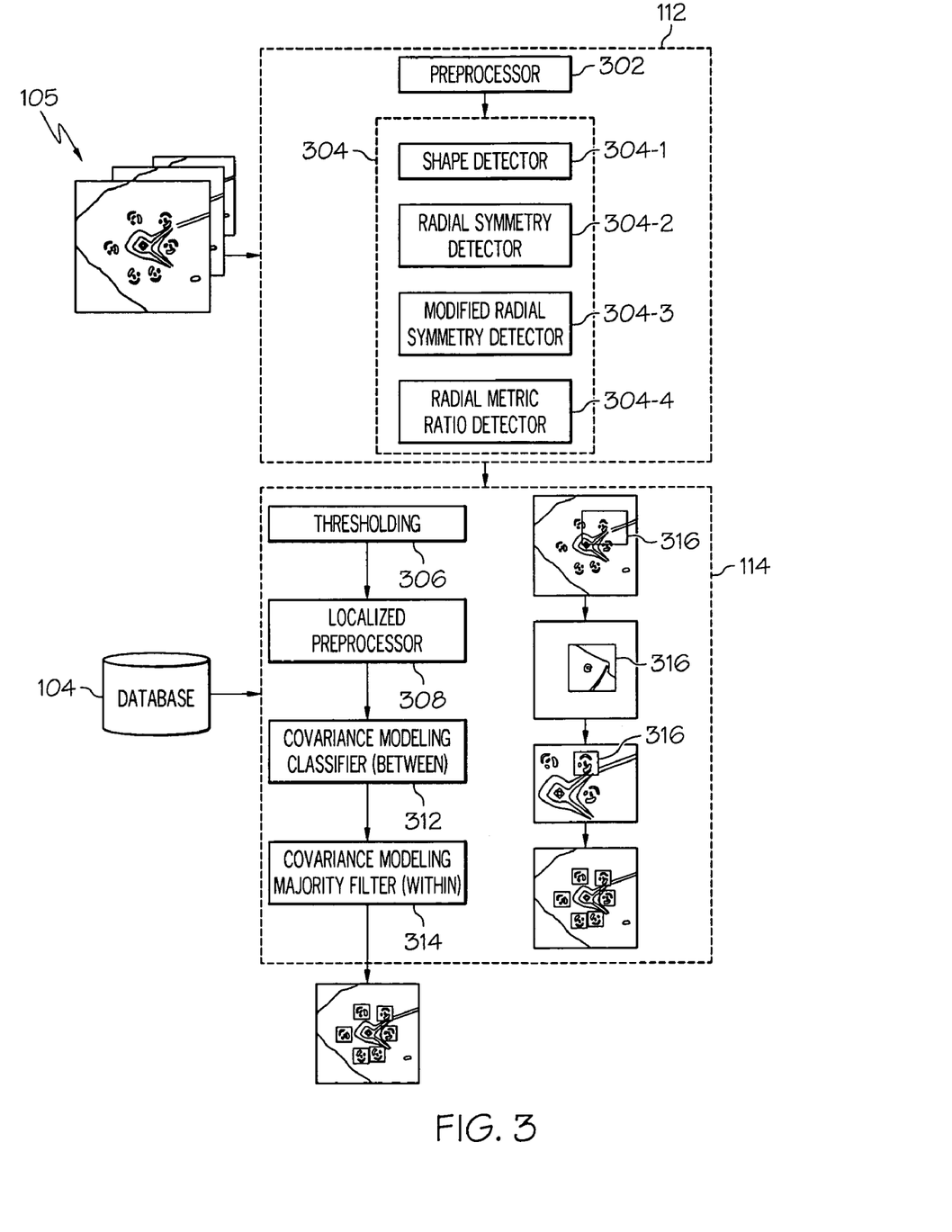
FIG. 3 depicts a functional block diagram of one processing approach that may be implemented by a processing component of the system depicted in FIG. 1 to carry out the process depicted in FIG. 2.
Figure 4:
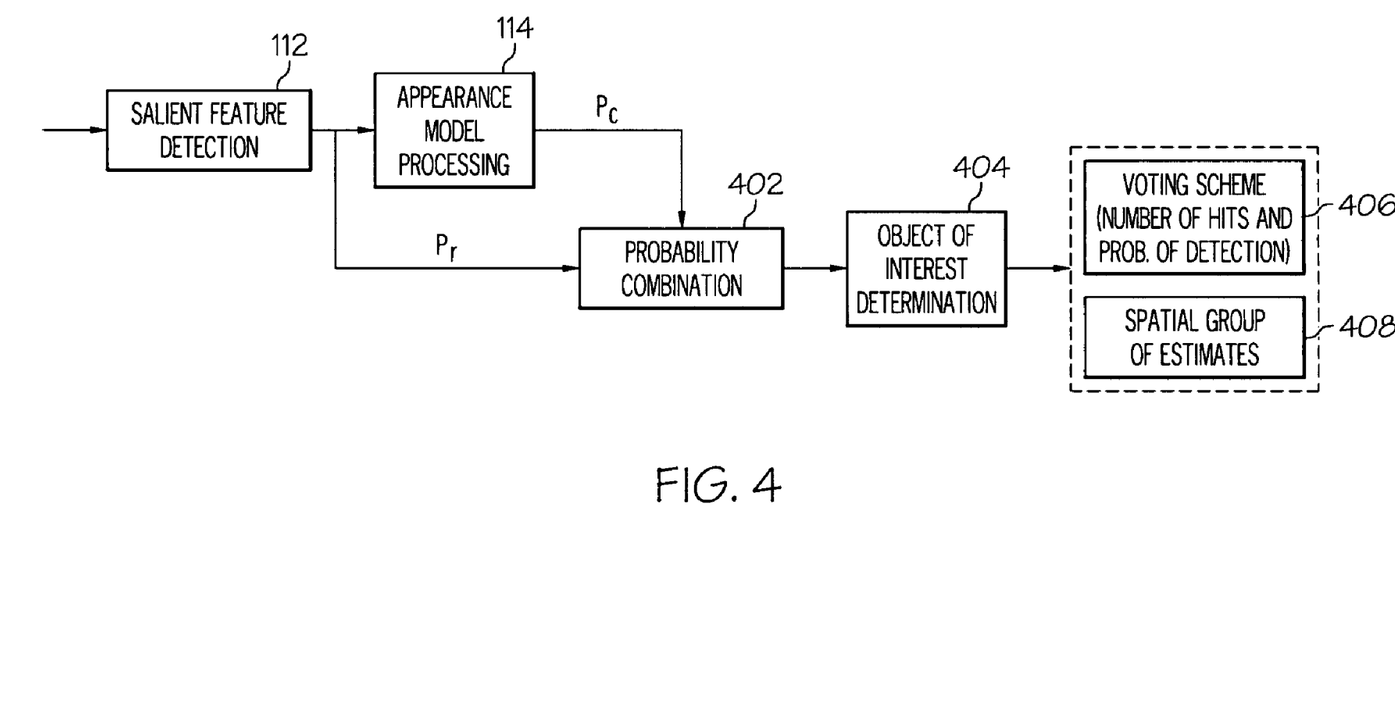
FIG. 4 depicts a functional block diagram of an alternate processing approach that may be implemented by a processing component of the system depicted in FIG. 1 to carry out the process depicted in FIG. 2.

Referring first to FIG. 3, it is seen that captured images 105 from the image capture device 102 (not shown in FIG. 3) are supplied to the processor 106, for initial processing by the salient feature detection 112 component. As is depicted in more detail in FIG. 3, the salient feature detection 112 component includes a preprocessing function 302 and a salient feature detector 304. The preprocessing function 302 implements various conventional image clean-up routines such as, for example, histogram equalization and Gaussian smoothing, to filter out noise and various other interferences. The cleaned up images are then past on to the salient feature detector 304.

The salient feature detector 304 analyzes the cleaned up images supplied from the preprocessing function 304 to identify potential objects of interest. To do so, the salient feature detector 304 detects the presence of various, predetermined salient features within the cleaned up images. As FIG. 3 depicts, and as was already alluded to above, the salient feature detector 304 may implement any one of numerous salient feature detectors now known or developed in the future. It was also previously noted that the particular salient feature detector 304 may vary depending, for example, on the shape of the objects of interest. The salient feature detectors 304 depicted in FIG. 3 include a generalized shape detector 304-1, a radial symmetry detector 304-2, a modified radial symmetry detector 304-3, and a radial metric ratio detector 304-4. The generalized shape detector 304-1 is representative of any one of numerous salient feature detectors, now known or developed in the future, that are configured to identify objects of a particular shape. The radial symmetry detector 304-2 and the modified radial symmetry detector 304-3 were already briefly described. The radial metric ratio detector 304-4 is used when potential objects of interest have circular, oval, or elliptical shapes. The radial metric ratio detector 304-4 implements a heretofore unknown detection paradigm, and thus will now be described in more detail.

Figures 5, 6:
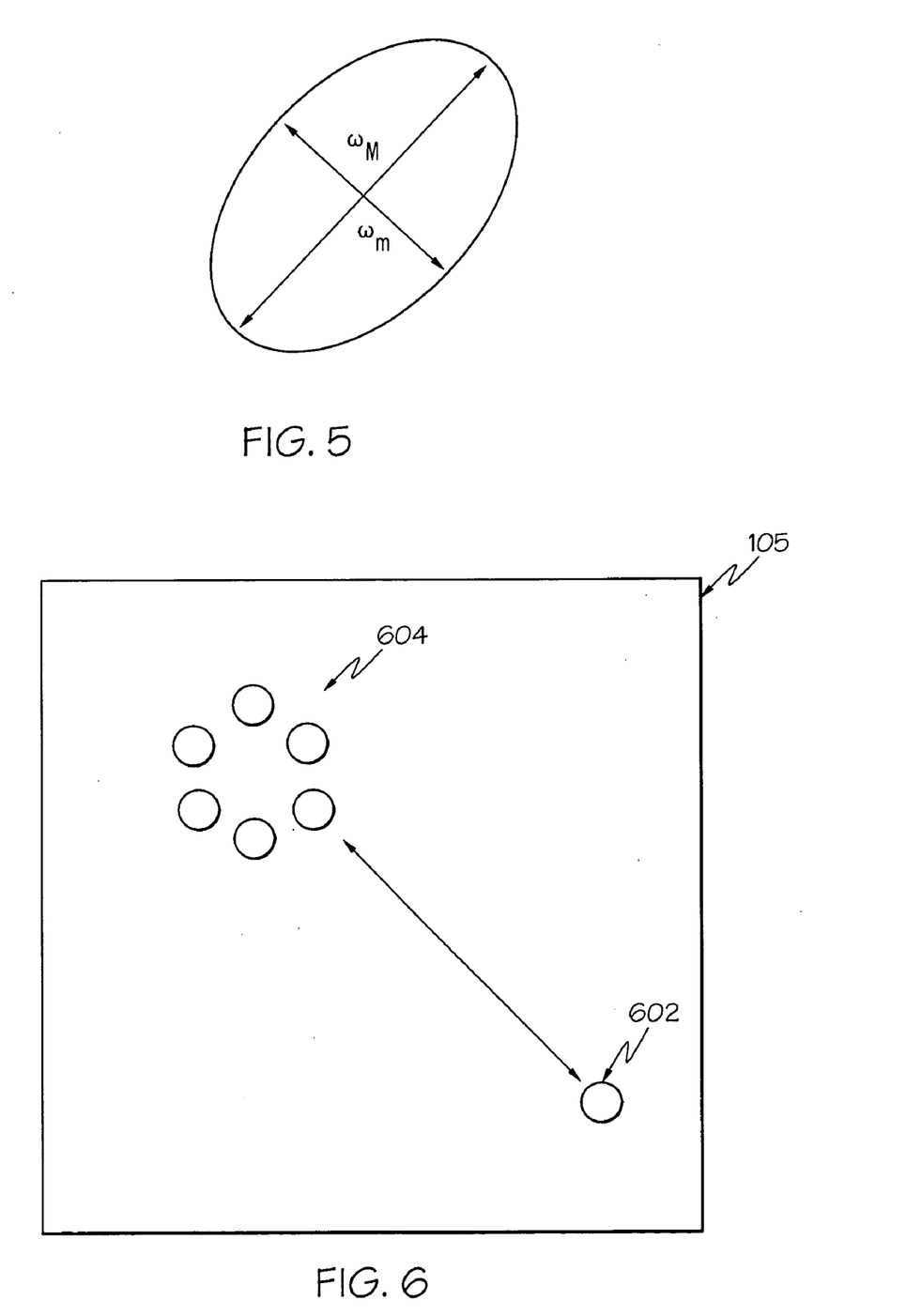
FIG. 5 depicts an exemplary outline of a non-circular blob that may be detected by a salient feature detection component that may be implemented by the system depicted in FIG. 1 to carry out the process depicted in FIG. 2.
FIG. 6 depicts a simplified representation of a captured image having a plurality of potential objects of interest therein and with one object of non-interest separated from the others.

The detection paradigm implemented by the radial metric ratio detector 304-4 is based on a blob analysis. Initially, the radial metric ratio detector 304-4 extracts a rectangular fit model to estimate the major and minor axes of the detected blob. The rectangular fit model may be any one of numerous known fitting models, one example of which is the convex hull fitting model. The radial metric ratio detector 304-4 then determines if the blob fits an elliptic shape using a simplified ratio that is independent of the orientation and scaling of the blob (see FIG. 5). This ratio is derived from the following Equation (A):

$$M_E = \frac{A}{(P)^2} = \frac{\pi ab}{2\pi^2(a^2 + b^2)} = \frac{\alpha}{2\pi(1 + a^2)},$$

where A is the area of an ellipse, P is the perimeter (or circumference) of an ellipse (using Euler's formula), a and b are the major and minor radii of an ellipse, respectively, and a is defined as by the following relationship:

$$\alpha = \max\left(\frac{\text{width}}{\text{height}}, \frac{\text{height}}{\text{width}}\right) = \frac{\omega_M}{\omega_m}.$$

Now, if $\omega_M$ and $\omega_m$ are then substituted into the equation for $M_E$, it is seen that the following Equation (B) is derived:

$$\tilde{M}_c = \frac{2\pi A(\omega_M^2 + \omega_m^2)}{\omega_M \omega_m P^2}.$$

As may be readily apparent, the value of $\tilde{M}_c$ approaches 1.0 for blob shapes that approach circularity. Before proceeding it is noted that the methodology just described is not limited to smooth contours, such as depicted in FIG. 5, but could be used with any one of numerous forms that may be approximated by an oval shape.

Returning once again to FIG. 3, after the salient features are detected within the captured image 105 and are normalized, the image (i.e., data representative of the image) is supplied to the appearance model processing 114 component. The appearance model processing 114 component implements a thresholding function 306, a localized preprocessor 308, a covariance modeling classifier 312, and a covariance modeling majority filter 314. The thresholding function 306, among other things, ensures that only regions of interest within the captured image 105 undergo further processing. Thus, as illustrated in FIG. 3, it is this function 306 that segments the captured image 105 into one or more regions of interest 316, where each region of interest 316 includes a detected salient feature. It will be appreciated, however, that other functions could be used to segment the captured image 105.

The localized preprocessor 308 further processes each of the one or more regions of interest 316. The localized preprocessor 308 implements, for example, histogram equalization, and additionally normalizes the dynamic range within the region of interest 316. Normalizing the dynamic range within the region of interest 316 provides uniformity across the regions of interest 316. The localized preprocessor 308 may also implement scaling of the regions of interest 316 with respect to the detected blob of the salient feature, and realignment of the salient feature shape with respect to the major and minor axis orientation. In some embodiments, the localized preprocessor 308 may additionally implement region calibration prior to feature extraction using the covariance appearance modeling. As will be described momentarily, the above-described first and second comparisons are conducted using multidimensional feature sets, and thus for consistency it is desirable that these comparisons be made using normalized features.

After the localized preprocessor 308 is implemented, the covariance modeling classifier 312 takes over. Before the covariance modeling classifier 312 and the covariance modeling majority filter 314 functions are described, some notes regarding the used nomenclature will be provided. The objects of interest that are represented by the stored covariance appearance models may also be referred to as "classes," since in some contexts the objects of interest are preferably categorized according to particular classes of objects or entities. Thus, the first comparisons may be referred to as "between class" comparisons and the covariance modeling classifier 312, which implements these comparisons, includes the parenthetical moniker "BETWEEN." Additionally, the second comparisons, as described above, compare the regions of interest 316 within the same image (i.e., the generated covariance appearance models for each region of interest). The majority of matches to the same object of interest (or class) indicate a high likelihood that a detected salient feature is a particular object of interest. Thus, the second comparisons may be referred to as "within class" comparisons and the covariance modeling majority filter 314, which implements these comparisons, includes the parenthetical moniker "WITHIN."

Turning now to the covariance modeling classifier 312 and the covariance modeling majority filter, it is noted that the covariance modeling classifier 312 implements two functions. The first function is generating the covariance appearance model for each of the one or more regions of interest 316. The second function is conducting the first comparisons of each of the generated covariance appearance models to the plurality of covariance appearance models stored in the database 104. As described above, these first comparisons are used to determine which of the one or more regions of interest 316 at least potentially include a known object of interest.

The covariance modeling majority filter 314 implements the previously-described second comparisons, during which each of the generated covariance appearance models for each of the one or more regions of interest 316 are compared to each other. As was also noted above, the determination as to whether each of the one or more detected salient features is a particular object of interest is made based on the first comparisons and the second comparisons. More specifically, based on the first comparisons, it may be determined that one or more of the regions of interest 316 of a captured image 105 potentially match a plurality of different objects of interest. Then, by comparing the regions of interest 316 within the same image (i.e., the generated covariance appearance models for each region of interest), the majority of matches to the same object of interest (or class) provides a high likelihood as to whether the detected salient feature is a particular object of interest.

Before proceeding further, and for completeness of description, a brief explanation of appearance modeling in general, and a detailed explanation of the appearance modeling implemented by the instant invention for generating the covariance appearance models and conducting the first and second comparisons will now be provided.

Appearance modeling captures a unique signature of image templates allowing for association of objects across multiple imageries at multiple perspectives. In the instant invention it is used to identify the appropriate object of interest template that best correlates with the detected objects of interest. The approach in the instant invention is based on defining an appearance model for every potential object of interest. These templates are stored in the database 104. Every detected object of interest should correlate a potential object of interest in the database regardless of its scaling, orientation or varying operation conditions. As a result, the appearance model should be robust to scale, orientation, perspective, and illumination changes.

The instant inventors have implemented a multidimensional feature set that integrates position, colorimetric, and texture characteristics of each detected object. The appearance model builds on this feature set and integrates these values of different units through the use of an auto-covariance matrix. The auto-covariance matrix allows for a compact signature of the appearance of each detected object in a captured image. Similarity between two appearances of an object is then measured by computing the distance between the corresponding auto-covariance matrices. In a particular preferred embodiment, comparisons comprise analyzing the linear dependencies between auto-covariance matrices, preferably via a Forstner and Moonen distance, as disclosed in the publication entitled, "*A metric for covariance matrices*," authored by W. Forstner, B. Moonen, and published in Technical report, Dept of Geodesy and Geo-informatics, Stuttgart Univ, 1999 (hereinafter Forstner et al.).

More specifically, a covariance matrix model is used to represent the appearance of detected salient features. As disclosed in the publication entitled, "*Covariance Tracking using Model Based on Means on Riemannian Manifolds*," authored by F. Porikli, O. Tuzel, P. Meer, and published in CVPR 2006 (hereinafter Porikli et al.), one reason that covariance appearance modeling is appealing is it fuses detected salient features in a more computational efficient form. In accordance with the instant invention, the covariance appearance models are multidimensional salient feature sets that integrate position, colorimetric, and texture characteristics of each detected object. These feature sets contain features that are built using different orientations and transitions of the templates.

Feature set selection may greatly impact system performance. For the instant invention, I(x,y) denotes a detected region of interest having dimensions M×N. The appearance model is built on multiple attributes that are salient to objects of interest such as spectral, textures, and contextual inter-pixel information. This allows it to localize the contextual features and texture properties, and therefore increase the accuracy of the model. The appearance model is also formulated to cope with scaling, orientations, and shift invariance, and hence is well suited for integrating multiple feature descriptors and allows for association of objects of interest at various perspectives and orientations. The covariance matrix is built over a feature set F containing spectral, spatial, and appearance attributes in accordance with the following (Eq. 1):

$$F = \left[\vec{x}, \vec{y}, I(x, y), \frac{\partial \vec{I}}{\partial x}, \frac{\partial \vec{I}}{\partial x \partial y}, \frac{\partial \vec{I}}{\partial y}, \vec{h}_{LBP}(I), \vec{h}_{median}(I), \ldots, \vec{h}()\right] \quad \text{(Eq. 1)}$$

The feature set F of dimension M.N×d is extracted from I(x,y) using different types of contextual filters (a median filter is used to capture the essence of the intensity histogram). Texture scores and structure attributes, i.e. gradient, and edge orientation, are also used, and local binary filters are included in the feature set to extract the texture content. This spatial modeling approach is based on recognizing the textural local binary patterns using multiple invariant operators to extract uniform patterns within an image.

It will be appreciated that the list in Eq. (1) can be extended by including higher order derivatives, and other spatial filters. Some non-limiting examples include Gabor filters with multiple orientations, and wavelet filters.

The appearance model builds on the feature set and integrates values of different units through an auto-covariance matrix. The auto-covariance matrix allows for a compact signature of the appearance of each detected change in a captured image. For example, a region of interest with a potential object of interest (e.g., detected salient features) may be represented with a M.N×d covariance feature matrix (C) defined by the following Equation (2):

$$C = (F - \vec{\mu}_F)^T (F - \vec{\mu}_F), \quad \text{(Eq. 2)}$$

where $\vec{\mu}_F = [\mu_x, \mu_y, \ldots, \mu_D]$ is the vector of the means of the corresponding F features for the associated image. The covariance matrix (C) can be written in the eigen-decomposition form as the following Equation (3):

$$C = U\Lambda U^T; \text{ where } \Lambda = \text{diag}[\lambda_1, \lambda_2, \ldots, \lambda_D], \quad \text{(Eq. 3)}$$

where the variable $\lambda_d$ represents the eigenvalues of the covariance matrix.

There are several advantages of using the covariance matrix as a region of interest descriptor. The covariance matrix leads to a more compact presentation of the stacked feature vector without any means of scoring against blind feature choices. Yet, it still embodies the entire set of extracted features without dealing with excessive dimensionality of augmented feature vectors.

The appearance attributes of a detected salient feature is measured against all of the covariance appearance models stored in the database 104. In accordance with the preferred embodiment of the instant invention, this is done by computing the distance between the corresponding auto-covariance matrices. Preferably, as was noted above, a Forstner and Moonen distance is calculated using Equation (4) below:

$$m(C_k, C_l) = \sqrt{\sum_{d=1}^{D} \log^2[\sigma_d(C_k, C_l)]}, \quad \text{(Eq. 4)}$$

where $\sigma_d(C_k, C_l)$ are the generalized eigenvalues of both matrices, computed from Equation (5) below:

$$\sigma_d C_k \vec{x}_d - C_l \vec{x}_d = 0. \quad \text{(Eq. 5)}$$

It is noted that the vector notation $\vec{x}_d$ represents the generalized eigenvectors.

A mathematically equivalent modification of the above technique projects the covariance of the object into the appearance space of each individual template (i.e., each individual stored covariance appearance model) before conducting the first comparisons. Based on this new adjustment of the algorithm, the distance measure m can be deduced, as a function of the eigenvalues of the individual covariance matrices, to the following simplified Equation (6):

$$m(C_k, C_l) = \sqrt{\sum_{d=1}^{D} \log^2\left(\frac{\lambda_{kd}}{\lambda_{ld}}\right)}. \quad \text{(Eq. 6)}$$

Furthermore, and based on an earlier assertion, if the feature vector (F) is extended to include a larger number of features, then additional modifications to the covariance appearance modeling may be introduced. Specifically, Fisher's Linear Discriminant (FLD) analysis may be applied to the appearance modeling to shape the scatter and make it more reliable for classification of potential objects of interest. This selects a weighted matrix in the linear transformation of the following Equation (7):

$$g_k = W^T f_k \, k = 1, 2, 3, \ldots (N \times M). \quad \text{(Eq. 7)}$$

Here, the D-dimensional feature vector is $f_k = F(k)$. Moreover, a method of was developed for selecting W in such a way that the ratio of between-class scatter and within-class scatter is maximized. In accordance with this method, the between-class scatter matrix is defined to be the following Equation (8):

$$S_B = \sum_{i=1}^{c} n_i (\overline{F}_i^T - \overline{F}^T)(\overline{F}_i - \overline{F}), \quad \text{(Eq. 8)}$$

and the within-class scatter matrix is defined to be the following Equation (9)

$$S_w = \sum_{i=1}^{c} \sum_{k \in \text{class}_i} n_i (F_k^T - \overline{F}_i^T)(F - \overline{F}_i), \quad \text{(Eq. 9)}$$

where the matrix $\overline{F}_i$ is the mean bank of features of class i, $n_i$ is the number of templates in class I, and the matrix $\overline{F}$ is the mean matrix of all samples.

If it is assumed that the within-class scatter matrix ($S_w$) is nonsingular, the ordinary PCA (principal component analysis) solution, as the matrix with orthonormal columns that maximizes the following argument would be the generalized eigenvectors of both matrices:

$$W = \mathrm{argmax} \frac{|W^T S_B W|}{|W^T S_w W|}.$$

Hence, $W_{d \times h}$ is selected to correspond to the h largest generalized eigenvalues of the pair $(S_w, S_B)$. The covariance appearance matrices of Equation (2) above may then be modified to Equation (10) as follows:

$$\tilde{C}_k = W_o^T C_k W_o. \qquad (Eq. 10)$$

The similarity measures $m(\tilde{C}_k, \tilde{C}_l)$ are applied in the same way as described above. It will be appreciated, however, that other measures beside the Forstner and Moonen distance may be applied as long as the other measures satisfy at least the following three metric axioms:

$$m(C_k, C_k) = 0,$$

$$m(C_k, C_l) \geq 0, \text{ and}$$

$$m(C_b, C_k) = m(C_k, C_l).$$

It is noted that Equation (6) satisfies the three metric axioms for positive definite matrices and is a much faster matching scheme than the one disclosed in Porikli et al.

The methodology described herein may use either of the measures defined by Equation (4) or Equation (6) for each salient feature detected by salient feature detection 112 component to determine the stored object(s) of interest or known objects of non-interest having the smallest distance from the detected salient features. As noted above, data representative of noise or various distractive objects are also modeled and stored in the database 104. Hence, if a match is found within a predefined range to a stored object of interest, then the detected salient feature is associated with that stored object of interest. If the match is to a distractive object (or object of non-interest), or if there are no matches, then the detected salient feature is declared a false positive.

Having described in detail the appearance modeling methodology implemented in the system 100, the previously mentioned parallel approach will now be described. In doing so, reference should now be made to FIG. 4. The parallel approach, similar to the series approach, implements both the salient feature detection 112 and the appearance model processing 114 components. These components 112, 114 are substantially identical in function and thus the descriptions of each will not be repeated. The parallel approach is also similar to the series approach in that the captured images 105 from the image capture device 102 (not shown in FIG. 4) are supplied to the processor 106, for processing by the salient feature detection 112 component and then the appearance model processing 114 component. However, in addition to this, the outputs of the salient feature detection 112 component and the appearance model processing 114 component are supplied to a probability combination function 402 to determine whether the regions of interest 316 include an object of interest.

The probability combination function 402, in combination with an object of interest determination function 404, determines whether the salient features detected by the salient feature detection 112 component correspond to an object of interest. In particular, the outputs of the salient feature detection 112 component and the appearance model processing 114 component each provide a probability (e.g., $P_r$ and $P_c$, respectively) that an object of interest was detected in the captured image 105. The probability combination function 402 combines these probabilities into a combined probability, and the object of interest determination function 404 uses the combined probability to determine whether the salient features detected by the salient feature detection 112 component correspond to an object of interest. In a preferred embodiment, the probability combination function 402 applies a greater weight to the output of the salient feature detection 112 component ($P_r$) in generating the combined probability.

As FIG. 4 further depicts, the parallel approach also implements a voting scheme 406 and a spatial grouping of estimates function 408. As noted above, the detected salient features in a region of interest 316 may match multiple objects of interest stored in the database 104. Hence, the voting scheme 406, based on the number of matches (e.g., "hits") and the combined probability, determines the particular object of interest that may have been detected in a region of interest 316. The spatial grouping of estimates function 408 determines whether one or more detected objects 602 of interest in the captured image 105 lie more than a predetermined distance from other detected objects of interest 604 in the same captured image 105. If so, this is indicative that the object of interest that is separated from other objects of interest is a false positive. This principle is depicted in simplified form in FIG. 6.

The covariance appearance modeling described above and that is implemented in the inventive system 100 is advantageous in mapping the augmented feature vectors into a more compact form. The small dimensionality of the model is well suited for its use in associating stored objects of interest with detected salient features. Given the large amount of data being processed per image, the ability to compare models fast enough to find particular objects of interest without forfeiting the reliability of the match is desirable.

The system and method described herein provides the capability to compare targets without being restricted to a good segmentation of associated blobs, and is sufficiently accurate to be deployed in a real-time environment to discriminate and associate targets of interest captured at different perspectives.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of recognizing particular objects of interest in a captured image, the method comprising the steps of:
   detecting one or more salient features within a captured image, wherein a salient feature is a feature in the captured image that is correlative to an object of interest;
   segmenting the captured image into one or more regions of interest, each region of interest including a detected salient feature;
   generating a covariance appearance model for each of the one or more regions of interest;

conducting first comparisons, each first comparison comprising comparing each of the generated covariance appearance models to a plurality of stored covariance appearance models to determine which of the one or more regions of interest at least potentially include a known object of interest;

conducting second comparisons, each second comparison comprising comparing each of the generated covariance appearance models to each of the other generated covariance appearance models;

determining a first probability that each of the one or more detected salient features is a particular object of interest, the first probability determined from the detection of the one or more salient features within the captured image;

determining a second probability that each of the one or more detected salient features is a particular object of interest, the second probability determined from the first comparisons and the second comparisons; and determining, based on the first probability and the second probability, whether each of the one or more detected salient features is a particular object of interest.

2. The method of claim 1, further comprising:
determining, based at least in part on one or both of the first comparisons and the second comparisons, whether each of the one or more detected salient features is not a particular object of interest.

3. The method of claim 1, further comprising:
determining if a detected salient feature is displaced a predetermined displacement magnitude from other detected salient features in the captured image; and
eliminating a detected salient feature as a particular object of interest if it is displaced the predetermined displacement magnitude.

4. The method of claim 1, wherein:
the particular objects of interest are at least circular in cross section; and
salient features are detected using a conventional radial symmetry detection paradigm, in which circular measure is based on an average of strengths of a set of radii.

5. The method of claim 1, wherein:
the particular objects of interest are at least circular in cross section; and
salient features are detected using a modified radial symmetry detection paradigm, in which circular measure is based on maximum of strengths of a set of radii.

6. The method of claim 1, wherein:
the particular objects of interest are at least circular in cross section or at least oval in cross section; and
salient features are detected using a radial metric ratio paradigm, in which an estimate of a circularity measure is calculated.

7. The method of claim 6, wherein the radial metric ratio paradigm is a blob analysis that comprises the steps of:
estimating an orientation of a detected blob;
extracting a rectangular fit model to estimate major and minor axes of the detected blob;
estimating the circularity measure.

8. The method of claim 1, further comprising:
normalizing each region of interest in contrast, scale, and orientation before generating the covariance appearance model thereof.

9. The method of claim 1, wherein the covariance appearance models are reduced dimension and optimized covariance appearance models that shape scatter between and within classes of objects of interest or non-interest.

10. A system for detecting and recognizing objects of interest in a captured image, comprising:

salient feature detection means for detecting one or more salient features within a captured image, wherein a salient feature is a feature in the captured image that is correlative to an object of interest; and image segmentation means for segmenting the captured image into one or more regions of interest, each region of interest including a detected salient feature;

appearance model generating means for generating a covariance appearance model for each of the one or more regions of interest;

first comparison means for conducting first comparisons, each first comparison comprising comparing each of the generated covariance appearance models to a plurality of stored covariance appearance models to determine which of the one or more regions of interest at least potentially include a known object of interest;

second comparison means for conducting second comparisons, each second comparison comprising comparing each of the generated covariance appearance models to each of the other generated covariance appearance models;

first probability determining means for determining a first probability that each of the one or more detected salient features is a particular object of interest, the first probability determined from the detection of the one or more salient features within the captured image;

second probability determining means for determining a second probability that each of the one or more detected salient features is a particular object of interest, the second probability determined from the first comparisons and the second comparisons; and probability combination means for determining, based on the first probability and the second probability, whether each of the one or more detected salient features is a particular object of interest.

11. The system of claim 10, further comprising:
means for determining, based at least in part on one or both of the first comparisons and the second comparisons, whether each of the one or more detected salient features is not a particular object of interest.

12. The system of claim 10, further comprising:
means for determining if a detected salient feature is displaced a predetermined displacement magnitude from other detected salient features in the captured image; and
means for eliminating a detected salient feature as a particular object of interest if it is displaced the predetermined displacement magnitude.

13. The system of claim 10, wherein:
the particular objects of interest are at least substantially circular in cross section; and
the salient features detection means detects features using a conventional radial symmetry detection paradigm, in which circular measure is based on an average of strengths of a set of radii.

14. The system of claim 10, wherein:
the particular objects of interest are at least substantially circular in cross section; and
the salient features detection means detects features using a modified radial symmetry detection paradigm, in which circular measure is based on maximum of strengths of a set of radii.

15. The system of claim 10, wherein:
the particular objects of interest are at least circular in cross section or at least oval in cross section; and
the salient features detection means detects features using a radial metric ratio paradigm, in which an estimate of a circularity measure is calculated.

16. The system of claim 15, wherein the salient features detection means is configured to:
  estimate an orientation of a detected blob;
  extract a rectangular fit model to estimate major and minor axes of the detected blob; and
  estimate the circularity measure.

17. The system of claim 10, further comprising:
  means for normalizing each region of interest in contrast, scale, and orientation, before generating the covariance appearance model thereof.

18. The system of claim 10, wherein the covariance appearance models are reduced dimension and optimized covariance appearance models that shape scatter between and within classes of objects of interest or non-interest.

19. A method of recognizing particular objects of interest in a captured image, the method comprising the steps of:
  detecting one or more salient features within a captured image, wherein a salient feature is a feature in the captured image that is correlative to an object of interest;
  segmenting the captured image into one or more regions of interest, each region of interest including a detected salient feature;
  generating a covariance appearance model for each of the one or more regions of interest, each covariance appearance model a reduced dimension and optimized covariance appearance model that shape scatters between and within classes of objects of interest or non-interest;
  conducting first comparisons, each first comparison comprising comparing each of the generated covariance appearance models to a plurality of stored covariance appearance models to determine which of the one or more regions of interest at least potentially include a known object of interest;
  conducting second comparisons, each second comparison comprising comparing each of the generated covariance appearance models to each of the other generated covariance appearance model; and
  determining, based at least in part on the first comparisons and the second comparisons, whether each of the one or more detected salient features is a particular object of interest.

* * * * *